United States Patent [19]

Xenzhek et al.

[11] 4,397,921
[45] Aug. 9, 1983

[54] ELECTROCHEMICAL CELL CONTAINING SULPHUR DIOXIDE AS CATHODIC DEPOLARIZER

[75] Inventors: Oktavian S. Xenzhek; Elena M. Shembel; Valentina I. Litvinova; Tamara L. Martynenko, all of Dnepropetrovsk; Leonid B. Raikhelson; Leonid A. Sokolov, both of Leningrad; Valentin Z. Moskovsky, Dnepropetrovsk, all of U.S.S.R.

[73] Assignee: Dnepropetrovsky Khimiko-Tekhnologichesky Institut Imeni F.E. Dzerzhinskogo, Dnepropetrovsk, U.S.S.R.

[21] Appl. No.: 292,486

[22] Filed: Aug. 13, 1981

[51] Int. Cl.[3] .............. H01M 4/36; H01M 6/14; H01M 4/48
[52] U.S. Cl. .................. 429/105; 429/196; 429/197
[58] Field of Search ............ 429/105, 50, 52, 101, 429/188, 194, 196, 197

[56] References Cited

U.S. PATENT DOCUMENTS 3,567,515  3/1971  Maricle et al. .................. 429/105
4,238,554  12/1980  Barella ........................... 429/105
4,331,743  5/1982  Dey et al. ....................... 429/196

Primary Examiner—Donald L. Walton
Assistant Examiner—Stephen J. Kalafut
Attorney, Agent, or Firm—Burgess, Ryan & Wayne

[57] ABSTRACT

The electrochemical cell according to the present invention comprises an anode of a metal capable of reducing sulphur dioxide, an inert porous cathode with the electron-type conductivity, preliminarily anodically polarized to a potential of from 4.5 to 4.7 V relative to a lithium electrode, and a non-aqueous electrolyte containing sulphur dioxide as a cathodic depolarizer, at least one aprotic organic solvent with a donor number of from 20 to 50, and an electrolyte salt which is inert relative to sulphur dioxide and the anode metal.

7 Claims, 2 Drawing Figures

ELECTROCHEMICAL CELL CONTAINING SULPHUR DIOXIDE AS CATHODIC DEPOLARIZER

FIELD OF THE INVENTION

The present invention relates to chemical sources of current with a non-aqueous electrolyte and, more specifically, it relates to an electrochemical cell containing sulphur dioxide as a cathodic depolarizer.

Such electrochemical cells are useful in radioelectronic instruments, mini-computers, medical and metereological instruments as well.

BACKGROUND OF THE INVENTION

Known in the art are electrochemical cells comprising an anode made of an alkali metal, preferably lithium possessing a high negative potential, an inert porous cathode with electron-type conductivity, a cathode depolarizer dissolved in a non-aqueous electrolyte and reduced on an inert cathode, or a cathodic polarizer in a solid-phase state.

Electrolytes should meet certain requirements, namely: high ionic conductivity, compatibility with electrode materials, capability of dissolving products of discharges. As the vehicle for electrolytes use is made of organic solvents such as propylenecarbonate, acetonitrile, ethylenecarbonate, dimethylsulphite, dimethoxyethane or mixtures thereof.

The use of mixed solvents makes it possible to enhance ionic conductivity of the electrolyte, while retaining low viscosity solution. Along with organic solvents use can be also made of inorganic solvents such as oxyhalides of sulphur, phosphorus, selenium, thiohalides of phosphorus. They are resistant to the effect of, for example, lithium and can be used in combination therewith as an active cathode depolarizer.

An ionic component of the electrolyte is represented by salts highly soluble in organic solvents. These are exemplified by lithium salts such as perchlorate, tetrafluoroborate, and hexafluorophosphate. The basic requirement imposed on salts is their inactivity relative to the cathode depolarizer and the anode metal.

As regards the state of the cathodic depolarizer, the above-mentioned electrochemical cells can be divided into two groups;

(a) electrochemical cells with a solid-phase cathodic active substance (oxides of metals, chromates, halides of metals, and sulphides), wherein the reduction of a cathodic reagent occurs in most cases according to the solid-phase mechanism;

(b) electrochemical cells with a cathodic active substance such as sulphur dioxide, thionyl chloride and the like dissolved in the electrolyte. The cathodic reduction of the active substance dissolved in the electrolyte proceeds on the surface of an inert electrode possessing such electron conductivity which enables unhindered transfer of electrons during an electrochemical reaction.

In a chemical current source of the system $Li-SO_2$ during the cathodic reduction of $SO_2$ on an inert cathode the following process occurs, as expressed by the general equation:

$$SO_2 + 2e + 2Li \rightarrow Li_2S_2O_4 \downarrow$$

The resulting lithium dithionite is sparingly soluble in the electrolyte and deposited on the surface of the inert electrode. The deposition of lithium dithionite results in blocking and passivation of the electrode surface, and, consequently, to deceleration of the process of cathodic reduction of sulphur dioxide (cf. U.S. Pat. No. 3,953,225).

As it has been demonstrated by the results of cyclic voltammetry on a smooth electrode, the more negative the potential of change of the scanning direction from the cathodic polarization to the anodic one, the more the anodic peak of oxidation of the products of $SO_2$ reduction becomes shifted towards the positive area and the higher is the value of this peak.

Similar relationships are inherent in the electrochemical reactions, wherein the products are not dissolved in the electrolyte, but accumulated on the electrode.

A similar process also occurs in a current source with another active substance dissolved in an electrolyte, in a source of the system $Li-SOCl_2$, wherein the active substance of the cathode is itself a solvent.

The paper by A.N. Dey and P. Bro ("Primary Li/SOCl$_2$ cells" J. Electrochem. Soc., vol. 125, No. 10) indicates that during the cathodic reduction of $SOCl_2$ on an inert cathode the following general reaction proceeds:

$$4Li^+ + 2SOCl_2 \rightarrow 4LiCl \downarrow + SO_2 + S \downarrow$$

The solid phases of LiCl and S deposited on the cathode surface provide a passivating effect thereupon.

In order to optimize performances of a current source, wherein during the cathodic reaction solid-phase products are formed, as the inert electrodes use is made of porous electrodes having a developed inner surface.

The solid-phase reaction product is distributed inside the pores and the process of the surface passivation is manifested to a considerably lesser extent than on a smooth electrode.

In the above-discussed papers devoted to studying the cathodic reduction of $SO_2$ and $SOCl_2$ it has been pointed out that the deposition of the reaction product inside the electrode pores results in swelling and has changed thickness and elasticity as well.

At the same time, due to propagation of the process inside the electrode, the true current density at the electrode surface is smaller than the calculated one. This results in the fact that the porous electrode within a specific range of current density values depending on the electrochemical properties of a given system and the electrode structure has a lowered polarization value as compared to a smooth electrode.

In current sources, wherein the product of a cathodic reaction is deposited on the cathode surface as a solid phase it is the cathodic process that limits their specific characteristics. In this connection, the microstructure of a porous inert electrode, while influencing the cathodic process course, also defines the efficiency of operation of the chemical source of current on the whole.

On a porous electrode the electrochemical process is distributed non-uniformly with respect to the electrode thickness. The process speed is maximum at the front surface and gradually lowered along the electrode depth due to the effect of the electrolytic resistance inside the pores and diffusion limitations relative to the active substance in pores.

With elevation of the current density the process nonuniformity is enhanced and it is expelled towards the front surface. The apparent working surface is reduced, polarization is increased and all the limiting factors are pronounced to a greater extent. In the case of the formation of a solid-phase reaction product the process is complicated by clogging of the pores with insoluble matter which hingers the propagation of the process inside the electrode.

Therefore, in contrast to a smooth electrode, the superficial layer of a porous electrode takes part in the electrochemical process and its thickness depends on a whole number of factors including structure of the electrode, its properties and the current density.

As has been already mentioned hereinabove, in the formation of a solid-phase product of the reaction of cathodic reduction of, e.g. $SO_2$ to lithium dithionite $Li_2S_2O_4$, the cathodic process limits the characteristics of the current source of the Li-$SO_2$ system. By changing the characteristics of the inert cathode whereupon the reduction of the dissolved active substance takes place, it is possible to considerably increase the power and energy capacity of the current source.

At present, inert porous electrodes are manufactured from carbonaceous or metal materials (cf. U.S. Pat. No. 3,892,589). However, electrodes from carbonaceous materials have found more extensive application. They are produced by any of the following processes: compression-molding, spraying, spreading, suction-on out of pulp. In all these processes a carbonaceous material is preliminarily disintegrated to a required particle size, mixed with a binder and, when necessary, with a pore-forming agent and/or hydropho- agent: in some processes a further heat treatment is effected. Thus, USSR Inventor's Certificate No. 459820 teaches a process for the manufacture of an inert electrode of a primary cell involving application onto a metal substrate of a suspension of a mixture of carbon black and graphite with a solution of a polymer in an organic solvent, followed by drying the thus applied layer.

Known in the art is an electrochemical cell (cf. U.S. Pat. No. 3,891,458, wherein the anode is made of Zn (Li, Mg, Na, Ca, Al) and the electrolyte and active cathodic substance is $SOCl_2$. The cathodic reduction of the active substance present in the liquid phase occurs on the surface of an inert cathode consisting of a three-dimensional Ni grate with a layer of a mixture of 80% by mass of acetylene carbon black, 17% by mass of graphite and 3% by mass of a binder deposited onto the grate by means of hot compression molding at the temperature of 200° C.

However, these electrochemical cells do not possess the required discharge capacity and power.

Increased values of specific power and energy capacity can be achieved through minimization of the passivation of the surface of the inert electrode with the solid-phase reaction product by means of variation of the electrode macrostructure, increasing the concentration of the active substance dissolved in the electrolyte, and the formation of a soluble cathodic product non-passivating the electrode surface.

U.S. Pat. No. 3,929,507 teaches a Li-$SO_2$ current source, wherein the electrolyte is made of a solution of lithium bromide in a mixture of acetonitrile and propylene carbonate.

Known in the art is a paper (Bro P., Kang H.Y., Schlaikjer C., Taylor H., High rate Li/$SO_2$ batteries "Record 10$^{th}$ Intersec. Energy Convers. Eng. Conf., Newark Del., 1975," New York, 1975, 432–436), wherein for a Li-$SO_2$ cell an electrolyte is used with various proportions of propylene carbonate, acetonitrile and lithium bromide from the standpoint of an optimal electrically conducting system.

An electrochemical cell is known, comprising sulphur dioxide as a cathodic depolarizer (cf. U.S. Pat. No. 3,567,515).

The anode is made of an alkali metal and the cathode from a carbonaceous material with a developed surface.

Depending on the nature of the salt which is dissolved in an organic solvent, the products of cathodic reduction can be either soluble or insoluble.

Insoluble products are formed when using salts of alkali metals and tetraalkylammonium. In case insoluble products are formed, porous inert cathodes are used.

As the organic solvents use is made of propylene carbonate and acetonitrile, mixtures thereof and the like.

However, the electrolytes employed in this cell provide a relatively low solubility of sulphur dioxide.

At a low solubility of sulphur dioxide in the electrolyte of an electrochemical cell, pressure tension sulphur dioxide vapours over the solution is sharply increased with a rise in temperature and, hence, the pressure in the system increases accordingly. This, on the one hand, limits the permissible working temperature range and, on the other hand, necessitates an increase in the mechanical strength of the cell housing, thus resulting in an increased weight of the current source.

Furthermore, this electrochemical cell has insufficient discharge characteristics, specific power capacity and power.

OBJECT OF THE INVENTION

It is an object of the present invention to increase the discharge energy capacity of an electrochemical cell with its high power being preserved.

It is another object of the present invention to broaden the working range of temperatures and improve the weight characteristics of an electrochemical cell.

The object of the invention is accomplished by the provision of an electrochemical cell comprising an anode of a metal capable of reducing sulphur dioxide, an inert porous cathode with electron conductivity, and a non-aqueous electrolyte containing sulphur dioxide as a cathodic depolarizer, an aprotic solvent and a salt of an electrolyte inert with respect to the anode metal and sulphur dioxide which, according to the present invention, contains as the above-mentioned inert cathode an electrode preliminarily anodically polarized to a potential of 4.5 to 4.7 V relative to the lithium electrode and/or, as an aprotic solvent, it contains at least one organic solvent with a donor number of from 20 to 50.

In the electrochemical cell according to the present invention use is made of a more efficient inert cathode so that its load can be lowered and the mass of the active substance can be increased, thereby improving the weight and volume characteristics of the current source. The use of the above-described cathode-electrode makes it also possible to increase power of the electrochemical cell, while preserving its initial size and weight, since on the electrochemically treated electrode the process can be carried out with substantially higher current densities.

Due to the use of organic solvents with a donor number of from 20 to 50 characterizing their complex-forming capacity, increased solubility of $SO_2$ is ensured, which results in higher energy capacity of the electrochemical cell, enlarging the range of its working temperatures, in an improvement of its weight characteristics and a decrease of its size. Solubility of $SO_2$ in the above-mentioned solvents and electrolytes is due to the formation of coordination bonds between Lewis acid —$SO_2$ and a base—solvent having centers with an increased electron density such as —O, N and others.

It is advisable that the anode metal be made of lithium or sodium possessing a high negative potential, while the inert cathode be made of a carbonaceous material.

It is also advisable that the electrochemical cell would contains, to increase its electrical conductivity, a mixture of propylenecarbonate, acetonitrile and dimethylformamide, or a mixture of propylenecarbonate and dimethylformamide.

DETAILED DESCRIPTION OF THE INVENTION

The electrochemical cell according to the present invention comprises an anode made of a metal capable of reducing sulphur dioxide, a cathode of a porous material inert to sulphur dioxide but wherein the latter could be reduced. The anode and the cathode are immersed in a non-aqueous electrolyte containing sulphur dioxide as a cathodic depolarizer, an aprotic solvent and an electrolyte salt inert to sulphur dioxide and to the anode metal.

As the anode is made of a metal which has a more negative potential in non-aqueous systems than sulphur dioxide. The most preferred metals are sodium and lithium having high activity and a lower equivalent weight and substantially inactive with respect to sulphur dioxide.

The cathode can be made of any substance with the electron-type conductivity, inert relative to sulphur dioxide, but whereupon it can be reduced.

"Inertness" means the absence of interaction between the material and $SO_2$, i.e. the absence of chemical oxidation, physical destruction, or deposition.

It is preferable to use a carbonaceous material for the cathode which can be made by any conventional method. Usually, during the electrochemical reduction of $SO_2$ there is deposition of an insoluble product on the cathode, which hinders its further reduction. For this reason, use is made of a cathode with a large surface area.

It has been found that if a cathode is preliminarily anodically polarized to a potential of from 4.5 to 4.7 V relative to the lithium electrode, there is improvement of specific characteristics of the electrochemical cell due to better parameters of the cathodic process.

A porous graphite electrode produced by any conventional method is subjected to an electrochemical anodic polarization in a non-aqueous electrolyte consisting of propylenecarbonate, 1 M $LiClO_4$, and 12% by mass of $SO_2$.

Figure 1:
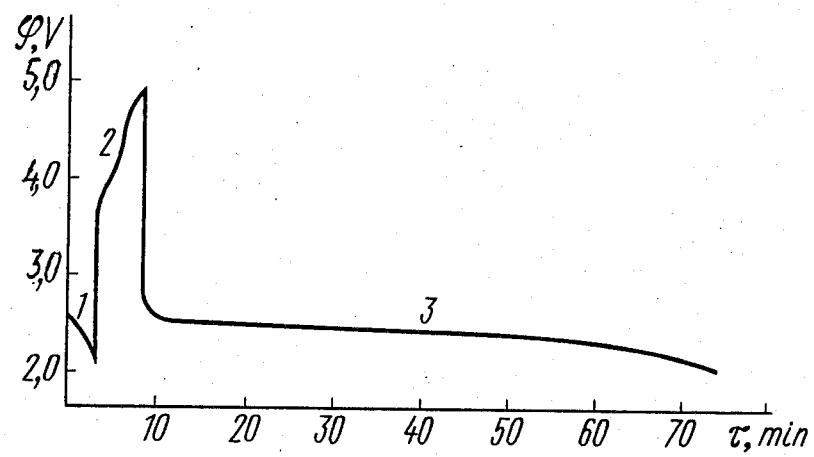

FIG. 1 shows typical curves illustrating the principle of electrochemical anodic activation of the electrode. Curve 1 corresponds to a cathodic galvanostatic curve on an electrode not subjected to the activation. Curve 2 is an anodic galvanostatic curve of the process of the electrode activation. And, finally, Curve 3 is a cathodic curve of the polarized electrode. It is quite clear that the discharge capacity is considerably increased after the electrochemical treatment. Cathodic galvanostatic curves correspond to reduction of sulphur dioxide dissolved in the electrolyte.

It was necessary to be sure that on the electrochemically activated electrode the increase of discharge capacity occurs due to facilitation of discharge of the active substance of sulphur dioxide dissolved in the electrolyte.

Figure 2:
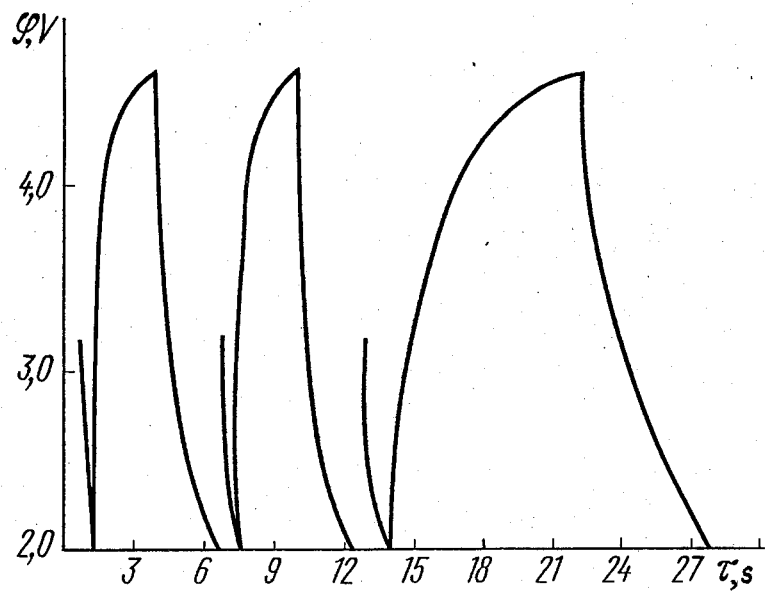

To this end, studies have been carried out in a background electrolyte, i.e. in an electrolyte containing no sulphur dioxide and consisting of propylenecarbonate and $LiClO_4$. The results thus obtained are shown in FIG. 2. As can be seen from this graph, despite the anodic polarization of the electrode, the length of cathodic galvanostatic curve or the discharge time remain substantially unchanged.

Therefore, the preliminary anodic polarization due to an improvement in the macrostructural or catalytic properties of a porous electrode leads to greater utilization of active substances dissolved in the electrolyte and, hence, to an increased energy capacity and power of the electrochemical cell.

It has been found that the anodic polarization of the electrode should be effected to a potential of 4.5–4.7 V, which corresponds to the value of potentials of anodic electrochemical decomposition of the electrolyte.

Given hereinbelow is Table 1 showing potentials of the beginning of the electrochemical decomposition of the electrolyte in the cathodic and anodic range, for example, on the platinum electrode.

TABLE 1

| Electrolyte | Cathodic potential, V | Anodic potential, V |
| --- | --- | --- |
| Solution of lithium perchlorate in propylenecarbonate | 1.0 | 4.5 |
| Solution of lithium perchlorate in dimethylformamide | 1.1 | 4.5 |
| Solution of lithium perchlorate in acetonitrile | 0.9 | 4.7 |
| Solution of lithium perchlorate in dimethylsulphoxide | 1.2 | 4.3 |

The investigations have shown that if an inert electrode produced by a known method is subjected to preliminary electrochemical anodic polarization to a potential of from 4.5 to 4.7 V relative to the lithium electrode in a non-aqueous electrolyte based on aprotic solvents employed in the electrochemical cell, the time of discharge on the treated electrode is substantially extended and the degree of utilization of active substances ($SO_2$) dissolved in the electrolyte is increased.

The preliminarily polarized electrode is transferred to the electrochemical cell.

As it has been already mentioned hereinabove, when use is made of thionylchloride as the active cathodic substance, the product of cathodic reaction, as in the case of $SO_2$, is solid-phase and passivates the electrode surface. In this connection it seems possible to efficiently employ a current source of the system Li/$SOCl_2$ which contains as an inert cathode an electrode which has been preliminarily polarized anodically to a potential of from 4.5 to 4.7 V.

Furthermore, it has been found that characteristics of the electrochemical cell do not depend on the time elapsed after the anodic polarization of the electrode.

The change of the surface of the electrode—cathode is characterized by the degree of activation which is a ratio of the amount of electricity for the discharge on a non-treated electrode to the amount of electricity for the discharge on an anodically-polarized electrode. The degree of activation depends on the initial macrostructure of porous electrode, specifically, porosity.

Table 2 lists characteristics of porous graphite electrodes kept for different periods of time after the anodic polarization effected at $I=2.6$ mA/cm$^2$ in an electrolyte consisting of propylenecarbonate, 1 M LiClO$_4$ and 12% by mass of SO$_2$.

TABLE 2

| Time of storage, days | Degree of activation |
|---|---|
| 48 | 13 |
| 68 | 14 |
| 107 | 11 |
| 215 | 12 |
| 237 | 11 |

Electrolytic salts employed in the cell according to the present invention are salts readily soluble in a solution of aprotic organic solvents and SO$_2$ and substantially inert to the electrode materials and sulphur dioxide.

Preferable salts are lithium perchlorate and lithium bromide due to their high electrical conductivity.

In order to increase the energy capacity, broaden the range of working temperatures, improve the weight characteristics, decrease the size of the electrochemical cell, studies have been carried out with various organic aprotic solvents from the point of view of solubility of sulphur dioxide therein and improvement of the discharge characteristics of the system.

When selecting the components of the mixture of solvents the anode resistance in aprotic solvents has been taken into consideration.

Thus, it is known that the solvents passivating the surface of lithium and ensuring its stability are propylenecarbonate (PC) and dimethylsulphoxide. The passivation effect of PC is manifested even with its content being as low as 1% by mass.

It has been found that the higher the complex-forming capacity of an aprotic organic solvent characterized by a donor number, the higher the solubility of SO$_2$ therein and in an electrolyte based on this solvent. It is advisable that a solvent be used which has a donor number of from 20 to 50.

It is also possible to use for the preparation of the electrolyte a mixture of solvents, wherein at least one solvent should have a donor number within the abovespecified range.

Table 3 provides data on the solubility of SO$_2$ in aprotic organic solvents and electrolytes based thereon.

All the above data are given for the temperature of 25° C. and pressure of 1 atm. It is seen from the Table that the solubility of SO$_2$ is also affected by the electrolyte salt. The higher the solvating ability of a salt, the higher is the solubility of SO$_2$ in the electrolyte.

Studies have shown that mixtures of aprotic organic solvents and electrolytes based thereon display additivity of their properties from the standpoint of the solubility of SO$_2$. The data is given in Table 4 hereinbelow.

TABLE 3

| | | | | Solubility of sulphur dioxide | | | | | |
|---|---|---|---|---|---|---|---|---|---|
| | Molecular | | Donor | In the solvent | | In the electrolyte | | | |
| | | | | | | LiClO$_4$ | | LiBr | |
| Solvent | weight | Density | number | m/m | m/l | m/m | m/l | m/m | m/l |
| Acetonitrile AN | 41 | 0.77 | 14.1 | 0.54 | 10.34 | 0.52 | 9.56 | 0.62 | 8.78 |
| Propylenecarbonate - PC | 102 | 1.2 | 15.1 | 0.89 | 10.43 | 0.65 | 7.57 | 0.84 | 9.75 |
| Dimethylformamide - DMFA | 73.1 | 0.94 | 27 | 1.51 | 20.14 | 1.20 | 15.65 | 1.47 | 18.91 |
| Dimethylsulphoxide - DMSO | 78 | 1.09 | 29.8 | 1.56 | 22.06 | 1.23 | 17.36 | — | — |
| N—methylpyrrolidone | 99.1 | 1.03 | | 1.72 | 17.85 | 1.37 | 13.78 | 1.61 | 16.35 |
| Hexamethanol | 226 | 1.03 | | 2.66 | 12.13 | | | | |

TABLE 4

| | Solubility of sulphur dioxide, ml | | | | | |
|---|---|---|---|---|---|---|
| | In solvents | | In the electrolyte | | | |
| | | | LiClO$_4$ | | LiBr | |
| Mixture of solvents | Calcul. | Experimental | Calc. | Exper. | Calc. | Exper. |
| AN + PC (1:1) | 10.3 | 9.7 | 8.6 | 8.6 | 9.3 | 10.8 |
| AN + DMFA (1:1) | 14.6 | 16.8 | 12.6 | 11.9 | 13.8 | 14.0 |
| AN + DMSO (1:1) | 14.5 | 14.8 | 13.5 | 13.9 | — | — |
| DMFA + DMSO (1:1) | 20.4 | 22.1 | 16.5 | 18.1 | — | — |
| DMFA + PC (1:1) | 14.3 | 15.3 | 11.6 | 11.3 | 14.3 | 14.9 |
| DMFA + PC (2:1) | 16.2 | 16.3 | | | | |
| DMFA + PC (1:2) | 12.3 | 13.1 | | | | |

An important characteristic of an electrolyte is its electrical conductivity. Table 5 shows the data on the electrical conductivity of certain electrolytes based on individual aprotic organic solvents and mixtures thereof.

It can be seen from the Table that introduction of a complex-forming solvent into a mixture of solvents does not substantially impair electrical conductivity of the electrolyte as compared to the electrolyte based on a mixture of propylene-carbonate with acetonitrile.

TABLE 5

| Solvent | Specific electrical conductivity, $Ohm^{-1} \cdot cm^{-1}$ | | | |
|---|---|---|---|---|
| | LiClO$_4$ salt | | LiBr salt | |
| | without SO$_2$ | with maximum SO$_2$ content | without SO$_2$ | with maximum SO$_2$ content |
| Acetonitrile | $2.2 \cdot 10^{-2}$ | $2.4 \cdot 10^{-2}$ | $0.8 \cdot 10^{-2}$ | $2.6 \cdot 10^{-2}$ |
| Propylenecarbonate | $0.6 \cdot 10^{-2}$ | $1.2 \cdot 10^{-2}$ | $0.2 \cdot 10^{-2}$ | $1.4 \cdot 10^{-2}$ |
| Dimethylformamide | $1.5 \cdot 10^{-2}$ | $1.4 \cdot 10^{-2}$ | $0.62 \cdot 10^{-2}$ | $1.53 \cdot 10^{-2}$ |
| Dimethylsulphoxide | $1.0 \cdot 10^{-2}$ | $1.51 \cdot 10^{-2}$ | — | — |
| N—methylpyrrolidone | $0.7 \cdot 10^{-2}$ | $0.9 \cdot 10^{-2}$ | $0.7 \cdot 10^{-2}$ | $1.1 \cdot 10^{-2}$ |
| Mixture acetonitrile + propylenecarbonate 1:1 | $1.2 \cdot 10^{-2}$ | $1.6 \cdot 10^{-2}$ | $0.5 \cdot 10^{-2}$ | $1.8 \cdot 10^{-2}$ |
| Mixture acetonitrile + dimethylsulphoxide 1:1 | $1.8 \cdot 10^{-2}$ | $1.7 \cdot 10^{-2}$ | — | — |
| Mixture acetonitrile + dimethylformamide 1:1 | $1.8 \cdot 10^{-2}$ | $1.8 \cdot 10^{-2}$ | $1.5 \cdot 10^{-2}$ | $2.2 \cdot 10^{-2}$ |
| Mixture dimethylformamide + dimethylsulphoxide 1:1 | $1.2 \cdot 10^{-2}$ | $1.2 \cdot 10^{-2}$ | — | — |
| Mixture dimethylformamide + propylenecarbonate (1:1) | $1.0 \cdot 10^{-2}$ | $1.5 \cdot 10^{-2}$ | $0.8 \cdot 10^{-2}$ | $1.5 \cdot 10^{-2}$ |

The organic solvent, wherein sulphur dioxide is very soluble, also contributes to the improvement of discharge characteristics of the cathode. As can be seen from Table 6, in electrolytes based on dimethylsulphoxide and dimethylformamide the discharge capacity of the cathode (in the present case it is a product of the current by the time during which the electrode potential is varied from the initial value to the value of 2.2 V) is substantially higher than in the electrolytes based on propylenecarbonate, acetonitrile and a mixture thereof.

Table 6 shows the discharge characteristics of the cathode with a cathodic depolarizer SO$_2$ in non-aqueous electrolytes (inert substrate—platinum, three-electrode cell).

The electrochemical cell according to the present invention possesses an increased energy capacity due to the fact that with a smaller amount of a more efficient inert electrode it makes possible a corresponding increase in the amount of the active substance and, therefore, to improve the weight and size characteristics of the current source. Energy capacity of the source is also increased by the use of solvents ensuring a high solubility of SO$_2$ which results in an increased content of SO$_2$ in the system without increasing the mechanical strength and, hence, the weight of the cell housing. The cell also features an increased power due to the use of an efficient electrochemically treated inert electrode and solvents increasing the discharge rate, whereby the process can be conducted with substantially higher current densities while preserving the initial weight and size of the cell.

TABLE 6

| Solvent | Salt | Current, D, µA | mA/cm$^2$ | SO$_2$ concentration, % | τ, sec | Q, µA · s |
|---|---|---|---|---|---|---|
| Propylenecarbonate | 1M,LiClO$_4$ | 12 | 0.06 | 12 | 68 | 820 |
| Propylenecarbonate | 1M,LiBr | 10 | 0.05 | 12 | 27 | 270 |
| Acetonitrile | 1M,LiClO$_4$ | 40 | 0.2 | 6.6 | 25 | 1 000 |
| Acetonitrile | 0,7M LiBr | 12 | 0.06 | 12 | 33 | 400 |
| Acetonitrile + propylenecarbonate 3:1 | 1M,LiBr | 12 | 0.06 | 12 | 37 | 450 |
| Dimethylformamide | 1M,LiClO$_4$ | 40 | 0.23 | 12 | 5000 | 200000 |
| Dimethylformamide | 1M,LiBr | 50 | 0.25 | 12 | 237 | 11850 |

TABLE 6-continued

| Solvent | Salt | Current, D, µA | mA/cm$^2$ | SO$_2$ concentration, % | τ, sec | Q, µA · s |
|---|---|---|---|---|---|---|
| Dimethylformamide + propylenecarbonate 1:3 | 1M,LiClO$_4$ | 40 | 0.23 | 12 | 950 | 38000 |
| Dimethylformamide + propylenecarbonate 1:1 | 1M,LiClO$_4$ | 40 | 0.23 | 12 | 1800 | 72000 |
| Dimethylformamide + propylenecarbonate 3:1 | 1M,LiClO$_4$ | 40 | 0.23 | 12 | 5000 | 200000 |

The electrochemical cell according to the present invention has a wider range of working temperatures due to a decreased vapor tension above the solution.

For a better understanding of the present invention some specific examples illustrating the electrochemical cell according to the invention are given hereinbelow.

EXAMPLE 1

An inert porous electrode employed in the electrochemical cell according to the present invention as a cathode and produced by compression-molding of graphite powder is subjected to anodic polarization to 4.5 V DC in a three-electrode system. In this system as the working electrode use is made of the above-mentioned graphite electrode, the reference electrode—lithium electrode, the auxiliary electrode—lithium electrode, the electrolyte—a 1 M solution of LiClO$_4$ in propylenecarbonate with 12% by mass of SO$_2$. The results of the anodic activation of the inert electrode-cathode are shown in Table 7 hereinbelow.

TABLE 7

| Current density of anodic polarization, mA/cm$^2$ | Activation degree |
|---|---|
| 3.5 | 3.4 |
| 2.1 | 7.8 |

TABLE 7-continued

| Current density of anodic polarization, mA/cm$^2$ | Activation degree |
|---|---|
| 1.3 | 12.9 |

EXAMPLE 2

An inert porous electrode-cathode is subjected to anodic polarization in a three-electrode system following the procedure similar to that described in the foregoing Example 1, except that the polarization is conducted at the constant potential of 4.5 V. Table 8 illustrates the effect of time on the degree of activation.

TABLE 8

| Time, min | Activation degree |
|---|---|
| 1 | 6.3 |
| 2 | 16.1 |
| 3 | 17.3 |

EXAMPLE 3

An inert porous electrode-cathode is subjected to anodic polarization to the potential of 4.65 V in a three-electrode system in a manner similar to that described in Example 1, except that the electrolyte is made of a 1 M solution of LiClO$_4$ in propylenecarbonate and acetonitrile (1:3) with 12% by mass of SO$_2$. The degree of activation at I=2mA/cm$^2$ is equal to 10.

EXAMPLE 4

The cell is made as a stainless steel cylinder with a height of 60 mm and a diameter 33 mm. The dry clean cell is placed into a box. The box is filled with preliminarily dried and oxygen-exempted argon. The electrolyte preparation involving dissolution of the salt and sulphur dioxide in a mixture of aprotic organic solvents is effected directly in the box. The electrolyte is a solution of lithium bromide in a mixture of propylenecarbonate and acetonitrile. The concentration of lithium bromide is 1.8 mol/l, the ratio of propylenecarbonate and acetonitrile is 1:3.3, the concentration of SO$_2$ is 65% by volume.

Sulphur dioxide is preliminarily passed through a drying system. The aprotic solvents are pre-dried and subjected to double distillation. The salts are recrystallized and dried. The electrodes are placed into the cell: a lithium anode with a surface area of 400 cm$^2$, and an inert carbonaceous cathode with a surface area of 400 cm$^2$. The carbonaceous inert cathode is preliminarily anodically polarized to the potential of 4.5 V relative to the reference lithium electrode. The voltage of the open circuit of the cell is 2.96 V. At the current density of 1.25 mA/cm$^2$, the discharge capacity of the cell is 8 A.hr at a voltage of 2.7 V.

EXAMPLE 5

The cell is made as described in the foregoing Example 4, except that the electrolyte is a solution of lithium bromide in a mixture of propylenecarbonate, acetonitrile and dimethylformamide in the ratio of 1:3.3:0.5, and the carbonaceous inert electrode has not been subjected to a preliminary anodic polarization. The open-circuit voltage of the cell is equal to 2.9 V. At the current density of 1.25 m A/cm$^2$ the discharge capacity of the cell is 8.5 A.hr at the voltage of 2.68 V.

EXAMPLE 6

The cell is made as described in Example 4, except that the electrolyte is made of a 1.8 m/l solution of lithium bromide in a mixture of propylenecarbonate, acetonitrile and dimethylformamide. The open-circuit voltage of the cell is 2.9 V. At the current density of 1.25 m A/cm$^2$ the discharge capacity is 8.8 A.hr at a voltage of 2.68 V.

EXAMPLE 7

The cell is made as described in Example 4, except that use is made of carbon inert cathode preliminarily anodically polarized to the potential of 4.6 V. The open-circuit voltage of the cell is 2.96 V. At the current density of 1.25 mA/cm$^2$, the discharge capacity is 8.4 A.hr at a voltage of 2.7 V.

What is claimed is:

1. An electrochemical cell comprising an anode of a metal capable of reducing sulphur dioxide, an inert porous cathode with electron-type conductivity, preliminarily anodically polarized to a potential of from 4.5 to 4.7 V relative to a lithium reference electrode, and a non-aqueous electrolyte containing sulphur dioxide as a cathodic depolarizer, at least one aprotic organic solvent having a donor number of from 20 to 50, and an electrolyte salt inert to sulphur dioxide and said anode metal.

2. The electrochemical cell of claim 1, wherein the anode metal is lithium.

3. The electrochemical cell of claim 1, wherein the anode metal is sodium.

4. The electrochemical cell of claim 1, wherein the inert cathode is made of a carbonaceous material.

5. The electrochemical cell of claim 1, wherein the aprotic solvent is a mixture of propylenecarbonate and dimethylformamide.

6. The electrochemical cell of claim 1 wherein the aprotic solvent is a mixture of propylenecarbonate, acetonitrile and dimethylformamide.

7. The electrochemical cell of claim 1 wherein said electrolyte salt is lithium perchlorate or lithium bromide.

* * * * *